Figure 2:
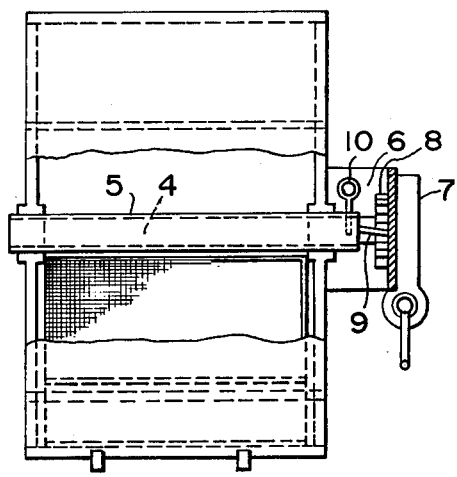

United States Patent [19]

Smith

[11] 4,061,111
[45] Dec. 6, 1977

[54] AUTOMATIC CHINCHILLA SANDER AND CLEANER

[76] Inventor: Charles A. Smith, 2540 Meldrum St., Windsor, Ontario, Canada

[21] Appl. No.: 700,452

[22] Filed: June 28, 1976

[51] Int. Cl.² ............................................. A01K 67/00
[52] U.S. Cl. ................................................. 119/159
[58] Field of Search ..................... 119/159, 15, 17, 18, 119/158, 1

[56] References Cited

U.S. PATENT DOCUMENTS

| | | | |
|---|---|---|---|
| 3,018,760 | 1/1962 | Tate | 119/159 |
| 3,254,627 | 6/1966 | Cross | 119/17 |
| 3,566,837 | 3/1971 | Denham | 119/17 |
| 3,713,321 | 7/1955 | Keen | 119/18 |

Primary Examiner—Russell R. Kinsey
Assistant Examiner—Peter K. Skiff
Attorney, Agent, or Firm—Charles Krassov

[57] ABSTRACT

This invention consists of an automatic device used in the raising of chinchillas to allow the animals to sand themselves in a bath of sand, and at the same time to clean said sand from the animal feces. The device consists of a stationary, vertical, circular box having a screen therein which rotates on an inner and outer central shafts pinned together when rotation is required. One position of the screen prevents the animal from entering the device, and another position allows the animal to enter and reach the sand. After a predetermined sanding time, the screen reverses itself, scoops up and discharges the animal, and sifts the sand clean of feces, and returns it to its original location. A clutch is provided to allow rotation when the screen limits are reached. Power is supplied manually, or by a speed reduced motor. And the periods and duration of sanding is controlled by an electric timing device where a motor is used. A quick attachment and release coupling is provided for joining several of the devices together.

6 Claims, 6 Drawing Figures

U.S. Patent  Dec. 6, 1977  4,061,111

AUTOMATIC CHINCHILLA SANDER AND CLEANER

This invention relates generally to devices used in the care of fur-bearing animals which are being raised on farms, and particularly to the sanding and sand cleaning operation required in the raising of chinchillas.

Among all the necessary conditions required in the breeding and raising of healthy, rich fur-bearing chinchillas, is the need of this animal to sand itself in a specific type of sand which must be supplied by the breeder. This sand must be available to the animals at regular intervals, for definite periods of time, and in a clean condition.

On a farm where a large number of animals are being raised, the cleaning of the sand from the feces of the animals and any other materials which may be harmful to them, and the matter of keeping track of the numerous and various cages, becomes a difficult and time consuming job.

It is therefore the object of this invention to provide an automatic, self cleaning sanding box which will permit the animal to enter the sanding area at predetermined regular intervals, for predetermined periods of time, which will remove the animal at the completion of the sanding period and discharge it back into the cage, and which will sift the sand clean, all in one operation.

Figure 1:
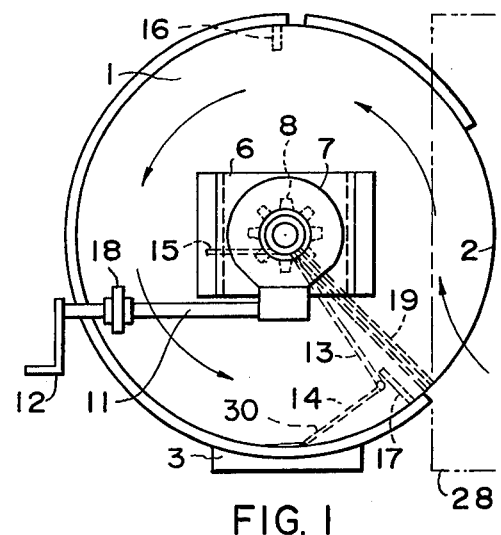
Figure 4:
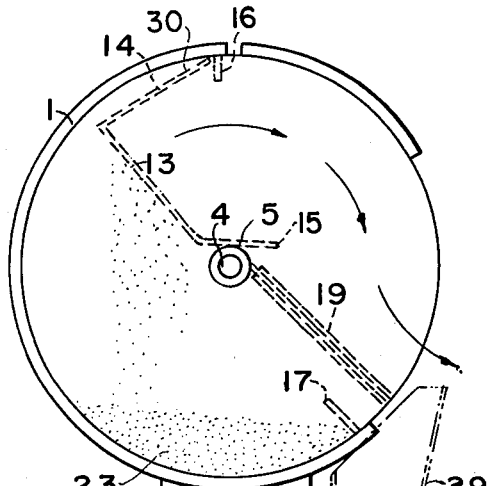
Figure 3:
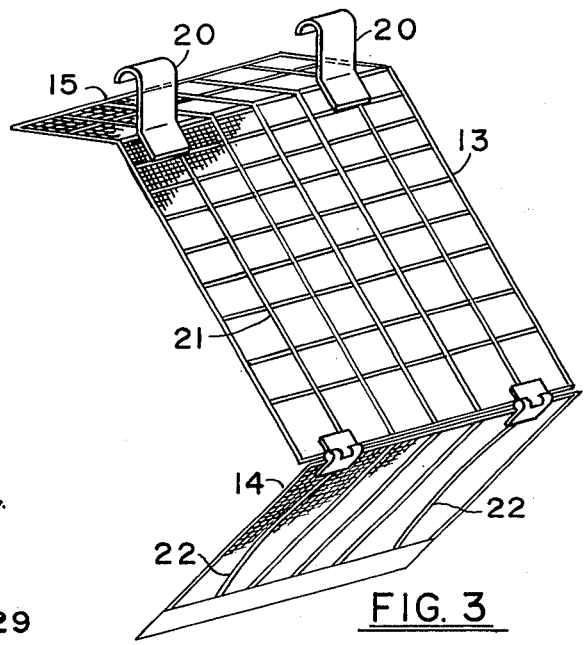
Figure 6:
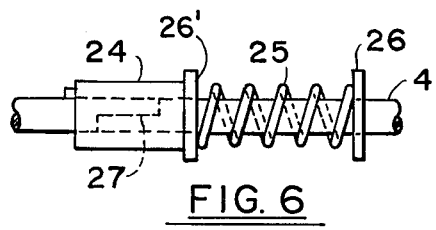
Figure 5:
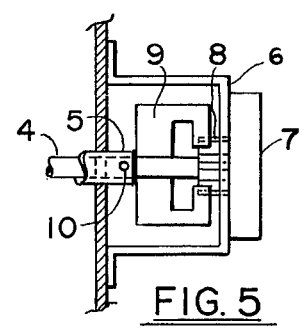

In describing the invention reference will be made to the attached drawing in which, FIG. 1, is an elevation of the invention, FIG. 2, is an end view of the invention, FIG. 3, is an isometric view of the screen component of the invention, FIG. 4, is an elevation of the invention showing a stage of its operation, FIG. 5 shows a diagram of a clutch for use with the invention, and FIG. 6, shows a diagram of a coupling for use with the invention.

In the drawings the invention is shown consisting of a vertical circular box 1 having an open entry 2. The box stands upright on legs 3. Running through the box 1 is a central shaft consisting of an inner solid shaft 4 which rotates freely within an outer hollow shaft 5.

Attached to the outer shaft 5 is a rectangular screen 13 which has a width slightly under that of the interior of the box 1, so that it can rotate freely therein. This screen has a main rectangular central section 13, an inwardly bent shorter section 15, and a lower hinged section 14 which is provided with a scraper 30 at its free end. The screen is reinforced in the rear with a wire grid 21, and is provided with brackets 20 by means of which it is rigidly attached to the outer shaft 5.

Rotation is provided to the inner shaft 4 by means of a worm gear speed reducer 7 through the medium of a clutch arrangement shown in FIG. 5, which consists of a "C"-shaped piece 9 of spring sheet metal material which engages a sprocket 8 rigidly attached to the output shaft of the reducer 7. When the screen 13 reaches the upper stop 16 or the lower stop 17 and the rotation continues, the "C"-shaped spring 9 skips over the teeth of the sprocket 8 without forcing the said screen to rotate.

In order for the screen to rotate, the outer shaft 5 is connected to the inner shaft 4 by means of a pin 10; and the input worm gear of the reducer is rotated manually by means of a shaft 11 to which is attached a handle 12.

The reducer 7 is centrally attached to one face of the box 1 by means of a "U"-shaped bracket 6 which contains the said clutch. The handle 12 can be replaced by an electric motor, in which case a friction clutch 18 can be provided as as additional precaution or as a replacement for the clutch described above.

The box 1 is also provided with a partition 19. This partition is made removable for cleaning purposes.

In FIG. 1, the screen 13 is shown in the position to permit the animal to leave the cage 28 and enter the sand pile 23. The path of the animal is indicated by arrows. After the animal has completed its sanding, the screen is rotated in a clockwise direction until it is stopped by the stop 16, where it assumes the position shown in FIG. 4. During this rotation the scoop part 14 which is additionally supported by a pair of springs 22,22, scoops up the sand and the animal. The sand 23 is sifted through the screen, and returns in a cleaned condition to its original location, while the animal is able to return to its cage as shown by the arrows in FIG. 4.

On a farm where many cages are located in a row, a central motivating unit as described in the drawings can provide the above described service to all the cages by coupling their shafts 4 to the shaft 4 of the motivating unit. A proposed quick attachment and release coupling is shown in FIG. 6, where the ends of said shafts are cut in half so that they fit each other as shown by 27. A sleeve 24 fits over the joint and is held in position against a pin in the shaft by a spring 25 located between the rear of the sleeve 24 and a stop 26'.

A pan 29 is provided at the entrance 2 of the box 1, for collecting the screenings resulting from the screening of the sand.

Where a number of the units are coupled together, any one of the units can be disconnected from rotation, when so required, by removing its pin 10.

On occasion, as for instance during a prolonged absence of the attendant, automatic operation of the invention would be required. This is accomplished by providing a motorized motivating unit equipped with an electrical timing device which will turn the screen in either direction at predetermined regular intervals, and will provide a predetermined period for sanding.

From the above description it can be seen that this invention is a great time and labor saving device, and at the same time providing means of caring for the animals during the absence of an attendant.

Having described the invention, what I claim is,

1. A device for sanding chinchillas or similar furbearing animals, comprising in combination a circular container having an open entrance in its curved wall for the entry and discharge of an animal therethrough, and containing a sand mixture in the bottom thereof; a screen, located within said container for screening said sand and discharging said animal, which rotates upon a central shaft, said shaft consisting of an inner solid shaft and an outer hollow shaft; a press fitted pin running through both said shafts for connecting or disconnecting said outer shaft to or from said inner shaft; a speed reducer for rotating said screen; upper and lower stop means within said container for locating said screen in an animal entry position and an animal discharge position; clutch means for connecting said inner shaft to said speed reducer; coupling means for connecting said inner shaft on one device to the inner shaft of another similar device; and a removable partition located between the outer shaft and the bottom of said entrance, within the circular container, and slidably supported and held between a pair of U-shaped tracks which are attached to the side walls of the container, to prevent the animal from by-passing the screen entering or being discharged by said screen.

2. A device such as described in claim 1 in which the screen consists of a rectangular central section; a shorter and inwardly bent upper section which makes contact with the upper stop means when the screen completes the discharge position; a lower hinged section which scoops up the sand for sifting, and the animal for discharging; a wire grid for reinforcing the back of said screen; a pair of strap springs located on the underside of the hinged section to provide additional support to that section during the scooping operation; and a pair of attachments attached to the screen at the upper section bend, by means of which the screen is fixed to the said outer shaft.

3. A device such as described in claim 1 in which the said speed reducer is operated manually by means of a handle.

4. A device such as described in claim 1 in which the said reducer is electrically operated.

5. A device such as described in claim 1 in which the said clutch consists of a sprocket attached to the output shaft of said reducer; and a "C"-shaped spring attached to said inner shaft of the screen which makes contact with the teeth of said sprocket to rotate the screen when it is free, and said "C"-shaped spring skipping over said sprocket teeth when the screen is held against rotation.

6. A device such as described in claim 1 in which the coupling means of one unit with another consists of having the ends of each inner shaft cut in half longitudinally; having the flat parts of the cut ends abuting each other; and a spring loaded sleeve covering the abuting ends.

* * * * *